US012774071B2

(12) United States Patent
Ambler

(10) Patent No.: US 12,774,071 B2
(45) Date of Patent: Oct. 27, 2026

(54) MARINE VESSEL MOTOR MOUNTING ASSEMBLY

(71) Applicant: Rhodan Marine Systems of Florida, LLC, Sarasota, FL (US)

(72) Inventor: Lindsay Ambler, Myakka City, FL (US)

(73) Assignee: Rhodan Marine Systems of Florida, LLC, Sarasota, FL (US)

( * ) Notice: Subject to any disclaimer, the term of this patent is extended or adjusted under 35 U.S.C. 154(b) by 100 days.

(21) Appl. No.: 18/853,020

(22) PCT Filed: Mar. 27, 2023

(86) PCT No.: PCT/US2023/064993

§ 371 (c)(1),
(2) Date: Sep. 30, 2024

(87) PCT Pub. No.: WO2023/192824

PCT Pub. Date: Oct. 5, 2023

(65) Prior Publication Data

US 2025/0223023 A1 Jul. 10, 2025

Related U.S. Application Data

(60) Provisional application No. 63/325,598, filed on Mar. 30, 2022.

(51) Int. Cl.

*B63H 20/06* (2006.01)
*B63H 20/00* (2006.01)
*E05B 35/00* (2006.01)

(52) U.S. Cl.

CPC ........... *B63H 20/06* (2013.01); *B63H 20/007* (2013.01); *E05B 35/008* (2013.01)

(58) Field of Classification Search

CPC .............................. B63H 20/06; B63H 20/007
See application file for complete search history.

(56) References Cited

U.S. PATENT DOCUMENTS 4,889,507 A 12/1989 Tahara et al.
5,112,258 A 5/1992 Folsom
(Continued)

FOREIGN PATENT DOCUMENTS

EP 1081041 A2 3/2001
EP 3502382 A1 6/2019
WO WO-2006132609 A1 12/2006

OTHER PUBLICATIONS

PCT/US2023/064993 International Search Report and Written Opinion mailed Jul. 18, 2023.

*Primary Examiner* — Richard G Davis
(74) *Attorney, Agent, or Firm* — Goodwin Procter LLP

(57) ABSTRACT

Disclosed herein is a motor mounting assembly for a marine vessel having a locking mechanism for securing the motor (e.g., trolling motor) to the marine vessel. In some embodiments, the mounting assembly comprises an outer and inner plate, a pin, and a lock. In some embodiments, the outer plate has a cavity to receive the inner plate, which is configured to be secured to the marine vessel. In some embodiments, the motor is configured to be secured to the outer plate. In some embodiments a pin is placed within the inner and outer plates via apertures, to secure the inner and outer plates together. In some embodiments, the locking mechanism includes a lock configured to be inserted within the outer plate, and transition to a locked configuration to prevent the pin from being removed from the outer plate, thereby preventing removal motor and outer plate from the marine vessel.

20 Claims, 7 Drawing Sheets

(56) References Cited

U.S. PATENT DOCUMENTS

| | | | | | |
|---|---|---|---|---|---|
| 5,174,542 | A * | 12/1992 | DeLeeuw, Jr. | ....... | B63H 20/007<br>248/225.11 |
| 2022/0119087 | A1 * | 4/2022 | Payne | .................... | B63H 20/06 |

* cited by examiner

MARINE VESSEL MOTOR MOUNTING ASSEMBLY

CROSS-REFERENCE

This application is a national stage entry of International Application No. PCT/US2023/064993, filed Mar. 27, 2023, which claims priority to U.S. Provisional Application Ser. No. 63/325,598, filed Mar. 30, 2022, each of which is incorporated by reference herein in its entirety.

TECHNICAL FIELD

The present invention generally relates to securing a motor to a marine vessel, such as a trolling motor, and, specifically, to using a mounting assembly that includes a locking mechanism.

BACKGROUND

Motors, such as trolling motors, may be configured to be mounted and dismounted to a marine vessel as desired, and depending on use. For example, a bracket can be used where one piece is secured to a boat, and the motor is attached to a second piece, such that coupling the second piece to the first piece allows for a attachment of the motor to the marine vessel. The first piece and second piece may be coupled together using a movable coupler, such as a pin. However, existing attachment techniques can be cumbersome or difficult to use. A more user-friendly approach is needed.

SUMMARY

Described herein, in some aspects, is a marine vessel motor mounting assembly, comprising: an inner plate configured to be secured to the marine vessel; an outer plate configured to be secured to the motor on a first side, the outer plate comprising a cavity therethrough sized to receive the inner plate; a pin configured to be inserted within the outer plate and the inner plate; and a lock configured to be inserted within the outer plate, the lock comprising a lock body and a tab, the lock configured to transition from an unlocked configuration to a locked configuration, wherein, in the locked configuration, the tab protrudes from the lock body so as to contact the pin, thereby preventing the pin from being removed from within the outer plate and the inner plate, such that the inner plate is secured to the outer plate.

In some embodiments, the lock is configured to transition between the unlocked configuration and the locked configuration, using an actuation mechanism. In some embodiments, the actuation mechanism comprises a key that mates with the a distal end of the lock body.

In some embodiments, the tab is located at least partially within the lock body when in the unlocked configuration, such that the tab extends from within the lock body when transitioning to the locked configuration. In some embodiments, the pin comprises a groove at distal portion thereof, the groove being defined by two groove walls and corresponding edges, wherein the tab in the locked configuration is configured to contact a groove wall and/or corresponding edge of the two groove walls and corresponding edges when the pin is inserted within the outer plate.

In some embodiments, the inner plate comprises a first inner plate aperture, the outer plate comprises a first and second outer plate aperture, such that the pin is configured to be inserted within the first outer plate aperture, the first inner plate aperture, and the second plate aperture, so as to couple the inner plate and the outer plate together. In some embodiments, the outer plate further comprises a third outer plate aperture for receiving the lock. In some embodiments, the outer plate further comprises a channel between the second outer plate aperture and the third plate aperture. In some embodiments, the channel is configured to allow the tab to extend from the lock body located within the third outer plate aperture to the second outer plate aperture, so as to contact the pin. In some embodiments, the tab extends i) a first length from the lock body in the locked configuration, and a ii) a second length from the lock body in the unlocked configuration, wherein the first length is greater than the second length. In some embodiments, the tab in the unlocked configuration at least partially extends through the channel, such that the lock is secured to the outer plate within the third outer plate aperture.

In some embodiments, for any mounting assembly described herein, the motor is a trolling motor. In some embodiments, for any mounting assembly described herein, the inner plate is secured to a bow of the marine vessel.

Described herein, in some aspects, is a method for securing a motor to a marine vessel, the method comprising: securing a first plate to the marine vessel; placing a second plate over the first plate, wherein the second plate comprises a cavity therein such that the first plate is disposed within the cavity, the second plate configured to be secured with the motor; inserting a pin within the first plate and the second plate; inserting a lock within the second plate, wherein the lock comprises a lock body and a tab; and transitioning the lock from an unlocked configuration to a locked configuration, such that the tab extends from the lock body in the locked configuration to contact the pin, thereby preventing removal of the pin from the second plate.

In some embodiments, transitioning the lock to the locked configuration comprises using a key that mates with the a distal end of the lock body. In some embodiments, the tab is located at least partially within the lock body when in the unlocked configuration, such that the tab extends from within the lock body when transitioning to the locked configuration. In some embodiments, the pin comprises a groove at distal portion thereof, the groove being defined by two groove walls and corresponding edges, wherein the tab in the locked configuration is configured to contact a groove wall and/or corresponding edge of the two groove walls and corresponding edges within the second outer plate.

In some embodiments, the first plate comprises a first aperture, the second plate comprises a second and third aperture, such that the pin is configured to be inserted within the second aperture, the first aperture, and the third aperture, so as to couple the first plate and the second plate together. In some embodiments, the second plate further comprises a fourth aperture for receiving the lock. In some embodiments, the second plate further comprises a channel between the fourth aperture and the third aperture. In some embodiments, the channel is configured to allow the tab to extend from the lock body located within the fourth aperture to the third aperture, so as to contact the pin. In some embodiments, the tab extends i) a first length from the lock body in the locked configuration, and a ii) a second length from the lock body in the unlocked configuration, wherein the first length is greater than the second length. In some embodiments, the tab in the unlocked configuration at least partially extends through the channel, such that the lock is secured to the outer plate within the fourth aperture.

In some embodiments, for any method described herein, the motor is a trolling motor. In some embodiments, for any method described herein, the inner plate is secured to a bow of the marine vessel.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

In various embodiments, the present invention is directed to a motor mounting assembly for a marine vessel. In some embodiments, the motor includes a trolling motor. In some embodiments, the mounting assembly includes a locking mechanism so as to secure the trolling motor to the marine vessel, and thereby help prevent the trolling motor from being separated from the marine vessel (e.g., during use), and/or help prevent theft of the trolling motor. In some embodiments, the locking mechanism is integrated with the mounting assembly. In some embodiments, the locking mechanism is separable component from the mounting assembly.

Figure 1:
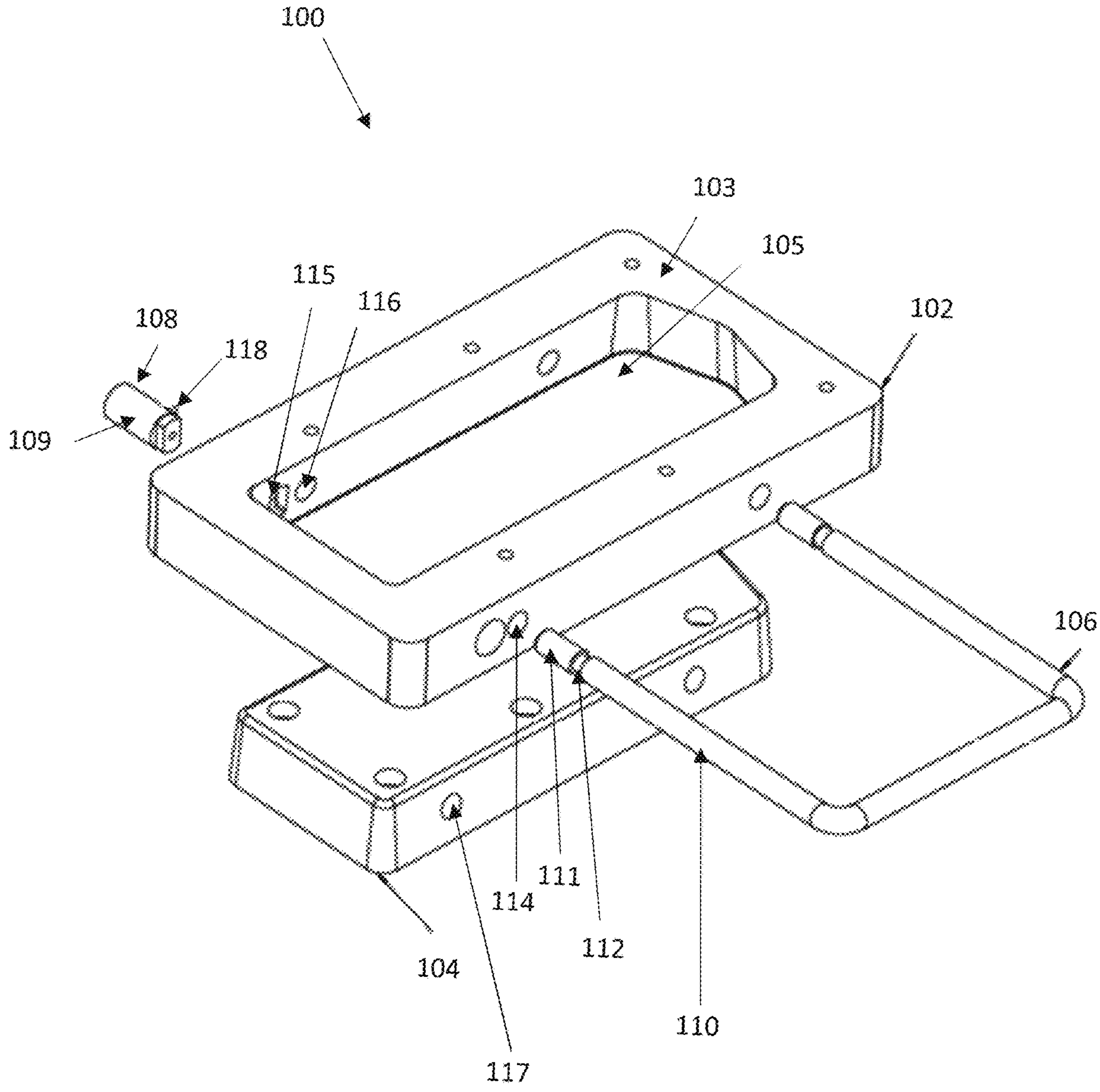
FIG. 1 depicts a schematic of an exemplary motor mounting assembly, according to an embodiment described herein.

FIG. 1 depicts an exemplary mounting assembly 100, as described herein. In some embodiments, the mounting assembly 100 comprises an inner plate 104 (e.g., first plate), an outer plate 102 (e.g., second plate), a pin 106, and a locking mechanism 108 (e.g., lock). In some embodiments, the inner plate 104 is configured to be secured to the marine vessel. For example, in some cases, the inner plate 104 is secured to the bow of a marine vessel. As used herein, marine vessel can be any vessel for displacement over water, such as a boat (including fishing boat), a ship, a raft, a canoe, etc. While this disclosure will typically describe the invention in the context of a marine vessel, the structures and concepts described herein can be adapted to other mechanisms: motor vehicles (e.g., cars, motorcycles, ATVs, etc.), bicycles, and even non-transport devices.

Figure 5:
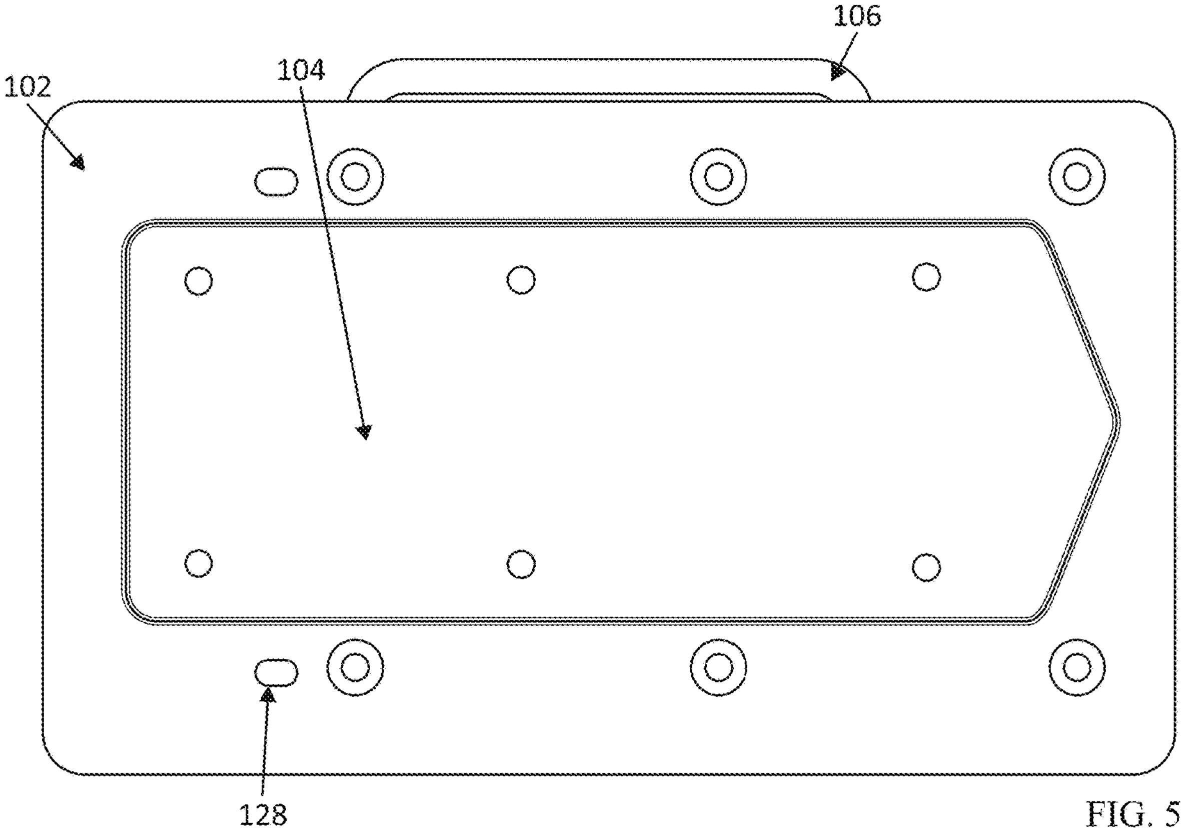
FIG. 5 depicts an assembled mounting assembly of the mounting assembly from FIG. 1.

In some embodiments, the outer plate 102 is configured to be secured to the motor (e.g., trolling motor) on a first surface 103. In some embodiments, the outer plate 102 includes a cavity 105. In some embodiments, the cavity 105, is size to receive the inner plate 104 therein. Accordingly, in some embodiments, the outer plate 102, with or without a motor secured thereto, is configured to be placed over an inner plate 104 secured to the marine vessel, wherein the inner vessel is then disposed within the cavity 105. See for example FIG. 5, wherein the inner plate 104 is disposed within the cavity 105, such that the outer plate 102 surrounds the inner plate 104.

Figure 2:
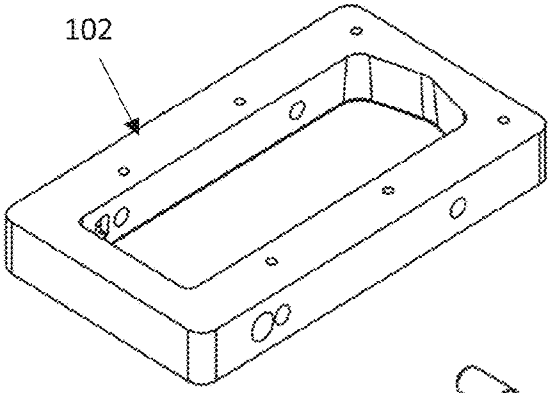
FIG. 2 depicts an outer plate of the mounting assembly from FIG. 1.
Figure 3:
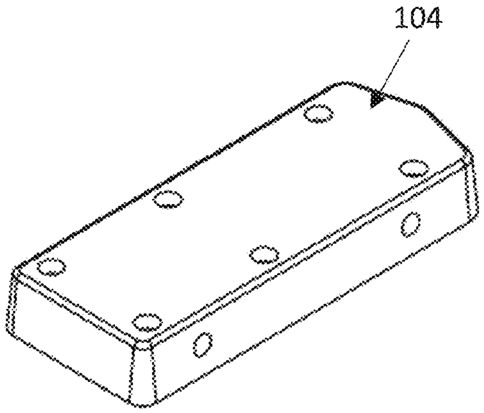
FIG. 3 depicts an inner plate of the mounting assembly from FIG. 1.
Figure 4:
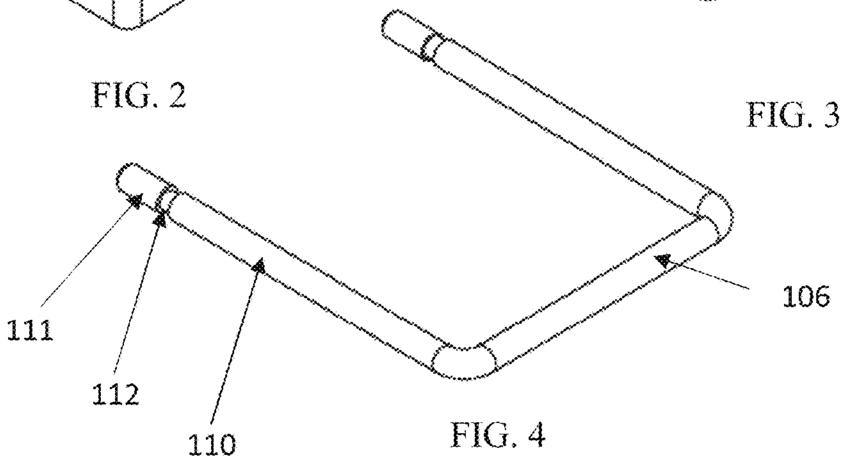
FIG. 4 depicts pin of the mounting assembly from FIG. 1.

FIGS. 2-4 further depict the outer plate 102, the inner plate 104, and the pin 106. In some embodiments, the pin 106 comprises a U-pin (as depicted), a single straight pin, an L-shaped pin, or others as known in the art. In some embodiments, the pin 106 comprises one or more stems (e.g., see 110). In some embodiments, the pin 106 comprises a groove 112 disposed on the stem 110. In some embodiments, the groove 112 is located at a distal portion of the stem 110. In some embodiments, the groove 112 is defined by groove walls and corresponding edges, wherein a first groove wall and edge is located at a distal cap 111 of the stem 110 interfacing with the groove (e.g., a distal boundary of the groove 112), and a second groove wall and edge is located opposite to the distal cap on the stem (e.g., proximal boundary of the groove 112).

With reference to FIGS. 1-4, the outer plate 102 and the inner plate 104 each include one or more apertures (holes) for insertion of the pin 106 therethrough. For example, in some embodiments, the outer plate 102 comprises a first outer plate aperture 114 that is located on a first lateral wall of the outer plate 102. In some embodiments, the outer plate 102 comprises a second outer plate aperture 116 located on a second lateral wall opposite the first lateral wall. In some embodiments, the first and second outer plate apertures 114, 116 are aligned to allow the stem 110 of the pin 106 to be inserted through both apertures. In some embodiments, the inner plate 104 comprise a first inner plate aperture 117. In some embodiments, the first inner plate aperture 117 is aligned with the first and second outer plate apertures 114, 116 when the inner plate 104 is located within the cavity 105, such that a stem 110 of the pin 106 is configured to pass through the first outer plate aperture 114, the first inner plate aperture 117, and the second outer plate aperture 116, such that the pin 106 is inserted within the inner plate 104 and the outer plate 102, thereby coupling the inner plate 104 and the outer plate 102 together (see for example FIG. 5). As described herein, in some embodiments, the outer plate 102 and the inner plate 104 include one or more additional sets of apertures (similar to aperture the set 114, 116, 117) so as to receive additional stems 110 from the pin 106, and/or to receive additional pins.

As described herein and depicted in FIG. 1, in some embodiments, the mounting assembly 100 includes a lock 108 configured to secure the pin 106 within the inner plate 104 and outer plate 102, so as to ensure the outer plate does not separate from the inner plate, and thereby help prevent the motor (e.g., trolling motor) from separating away from its location on a marine vessel. For example, in some embodiments, during use of the motor and without a lock, the pin may slide out of the inner and outer plate apertures. In some embodiments, the lock 108 helps prevent theft of the motor. For example, a motor, such as a trolling motor may be separated from the marine vessel by simply removing the pin 108 (e.g., pulling out the pin) from the inner and outer plates, and thus places the motor at risk of being stolen when left unattended (for e.g., if the motor is left on the marine vessel overnight). As described herein, in some embodiments, the lock 108 helps prevents unauthorized removal of the pin from within the inner and outer plates 102, 104, thereby keeping the outer plate 102 coupled to the inner plate 104, and accordingly keeping the motor secured to the marine vessel (via being secured to the outer plate 102).

Figure 6:
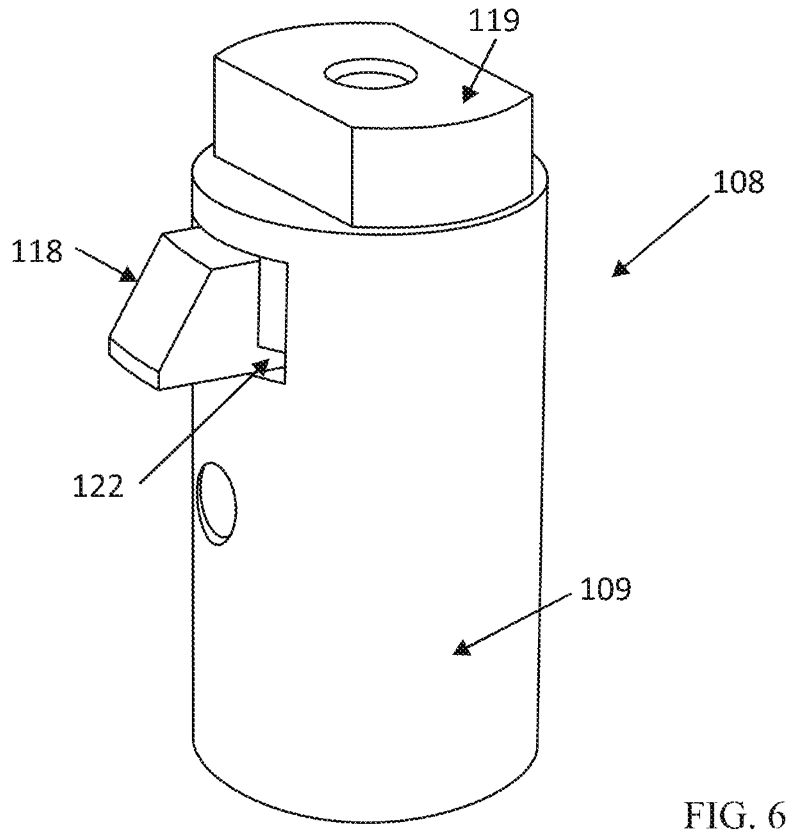
FIG. 6 depicts a perspective view of a lock of the mounting assembly from FIG. 1.

With reference to FIGS. 1 and 6-9, an exemplary embodiment of a lock 108 is shown. In some embodiments, lock 108 comprises a lock body 109 and a tab 118 configured to extend from the lock body 109. In some embodiments, the tab 118 is configured to be inserted within the lock body 109. For example, as depicted in FIG. 6, in some embodiments, the lock body 109 comprises an opening 122 configured to receive at least a portion of the tab 118.

Figure 8:
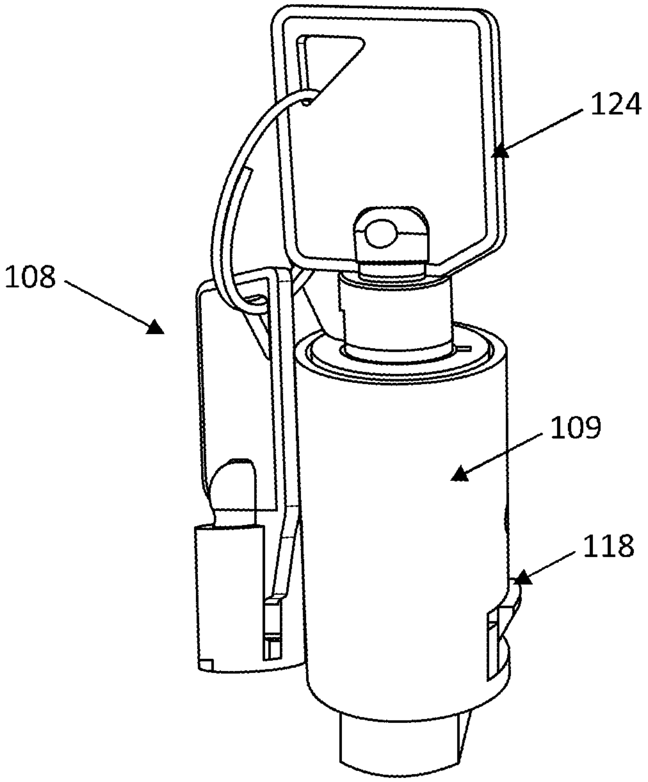
FIG. 8 depicts another perspective view of the lock from FIG. 6, further depicting a key and the lock in an unlocked configuration.
Figure 9:
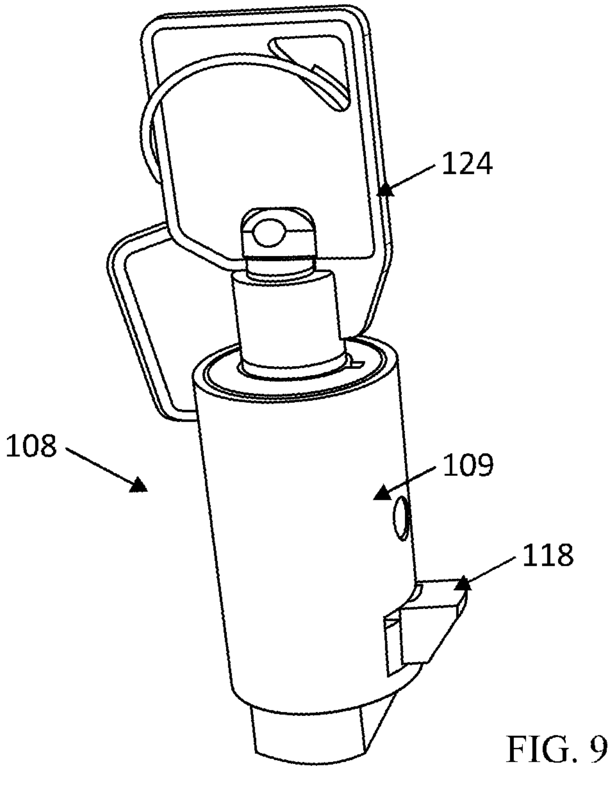
FIG. 9 depicts another perspective view of the lock from FIG. 6, further depicting a key and the lock in a locked configuration.

FIGS. 8-9 depict a lock 108 wherein the tab 118 is depressed (at least partially) within the lock body 109 (FIG. 8), and wherein the tab 118 extends from the lock body 109 (FIG. 9). In some embodiments, as described herein, the lock 108 is in an unlocked configuration when the tab 118 is depressed within the lock body 109, while the lock 108 is in a locked configuration when the tab 118 extends from the lock body 109.

Figure 7:
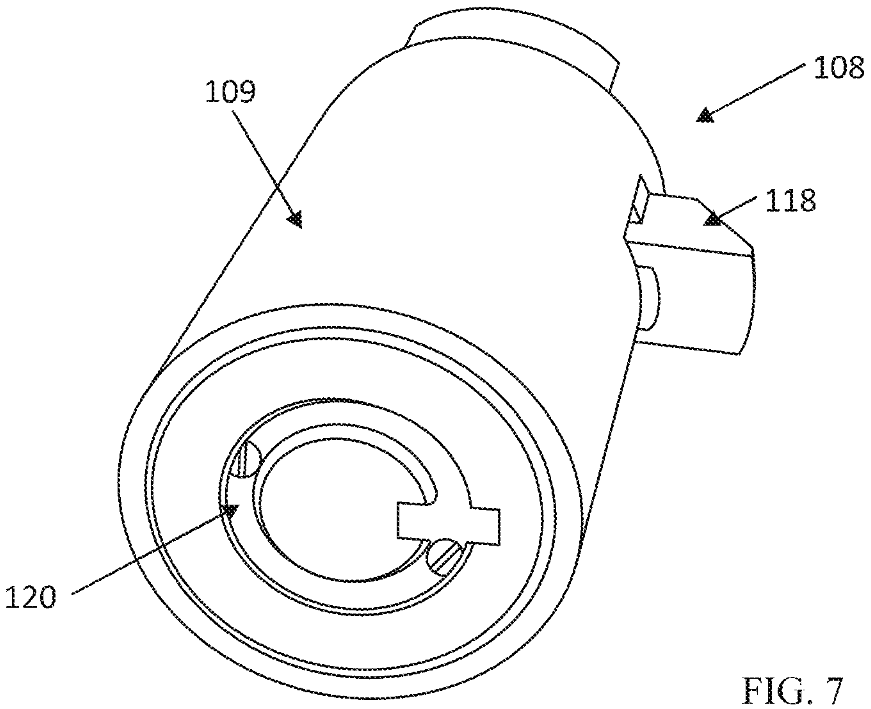
FIG. 7 depicts a view facing the bottom of the lock from FIG. 6.

In some embodiments, the lock 108 is configured to transition from an unlocked configuration (e.g., FIG. 8) to a locked configuration (e.g., FIG. 9), and vice versa, via an actuation mechanism. For example, in some embodiments, as depicted in FIGS. 8-9, the lock 108 further comprises a key 124 configured to transition the lock 108 from an unlocked configured to a locked configuration, and vice versa. In some embodiments, the key 124 is configured to mate with a portion of the lock body 109, for example a distal end 120 of the lock body (as depicted in FIG. 7). In some embodiments, the actuation mechanism comprises a push button, a sliding knob, a dial, or others known in the art.

Figure 10:
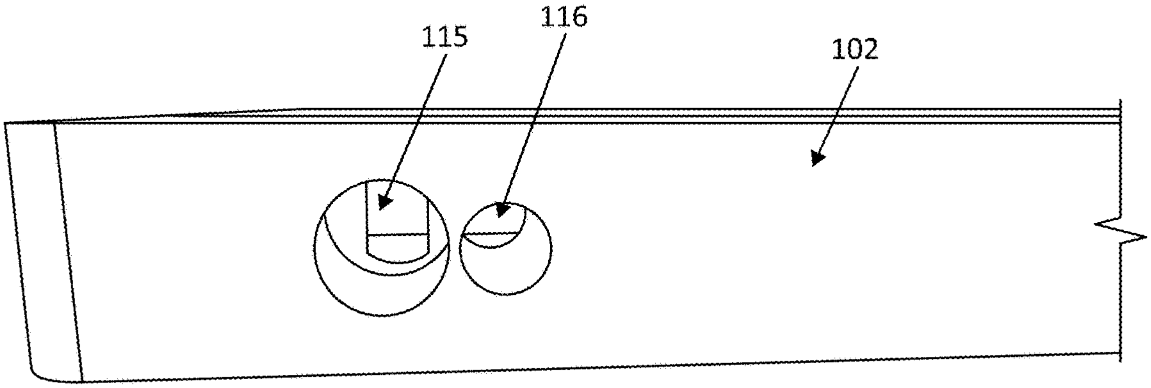
FIG. 10 depicts a side view of the outer plate of the mounting assembly from FIG. 1.
Figure 11:
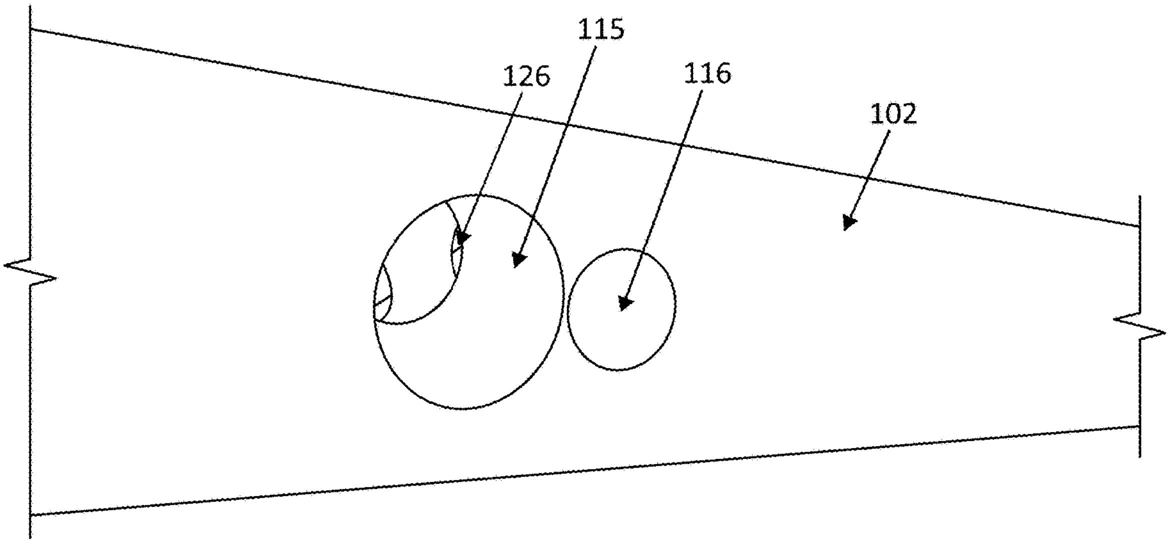
FIG. 11 depicts the side view of the outer plate from FIG. 10, further depicting a channel between two apertures within the outer plate.

FIGS. 10-11 depict an exemplary configuration of the outer plate 102 for a lock body 108 as described herein. For example, FIGS. 10-11 depict an outer surface of the second lateral wall of the outer plate 102 (e.g., opposite to the inner surface facing the cavity), wherein the second outer plate aperture 116 is depicted adjacent to a third outer plate aperture 115 (also depicted in FIG. 1). It should be noted that the outer plate 102 in FIGS. 10-11 is oriented upside down as compared to FIG. 1, hence the difference in alignment for apertures 115, 116 (left to right vs. right to left). In some embodiments, the third outer plate aperture 115 is configured to receive the lock 108. In some embodiments, the aperture 115 from the outer surface of the outer plate 102 is shaped (e.g., circular) to accommodate the entire lock body 109, while the aperture 115 at the inner surface of the outer plate 102 (e.g., see FIG. 1) is shaped to receive only a proximal portion of the lock body 109, which may be smaller (e.g., rectangular), such that the lock 108 cannot be pushed through entire aperture 115 (since for example, the larger circular portion cannot pass through the smaller rectangular shaped opening).

Figure 12:
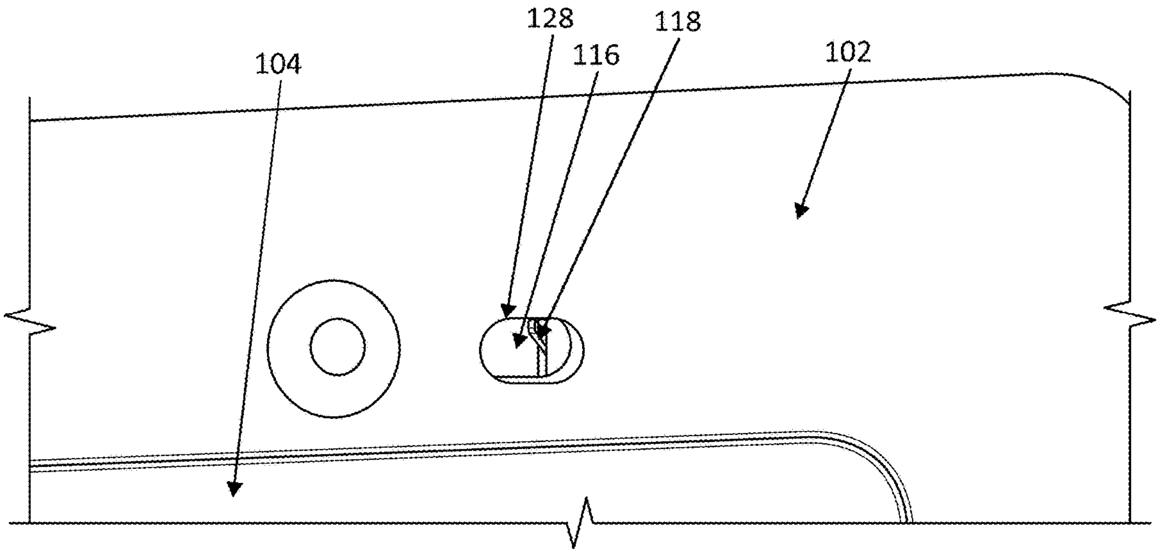
FIG. 12 depicts a partial top view of the outer plate of the mounting assembly from FIG. 1, wherein the lock is inserted within the outer plate and in an unlocked configuration.
Figure 13:
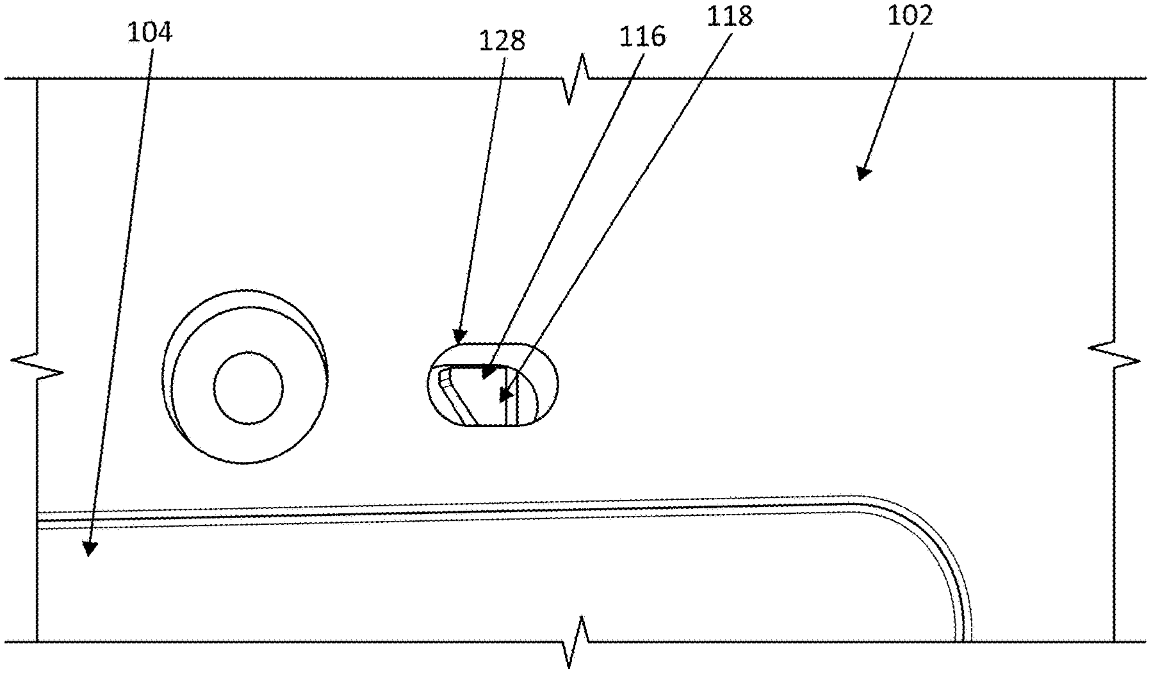
FIG. 13 depicts the partial top view of the outer plate from FIG. 12, wherein the lock is inserted within the outer plate and in a locked configuration.

In some embodiments, the outer plate 102 includes a channel 126 (FIG. 11) between the apertures 115 and 116. In some embodiments, the tab 118 from the lock is configured to extend through the channel 126 from aperture 115 to aperture 116, when the lock is in the locked configuration. For example, FIG. 12 depicts a top view of the outer plate 102, wherein a window 128 is provided looking down to the second outer plate aperture 116. As depicted in FIG. 12, the lock 108 is in an unlocked configuration, wherein a small portion of the tab 118 is visible. By contrast, in FIG. 13, the lock 108 is in the locked configuration, wherein the tab 118 is shown to extend across the second outer plate aperture 116. With reference to FIG. 12, in some embodiments, even when the lock 108 is in an unlocked configuration, a small portion of the tab 118 extends into the channel and optionally, partially into the second outer plate aperture 116, so as to prevent the lock 108 from being removed from within the third outer plate aperture 115. Accordingly, this may help keep the lock 108 with the outer plate 102 if it is being removed or displaced. In some embodiments, the tab 118 is able to be manually depressed (for e.g., via the window 128), so as to remove the lock 108 from the third outer plate aperture 115 if need be.

Figure 14:
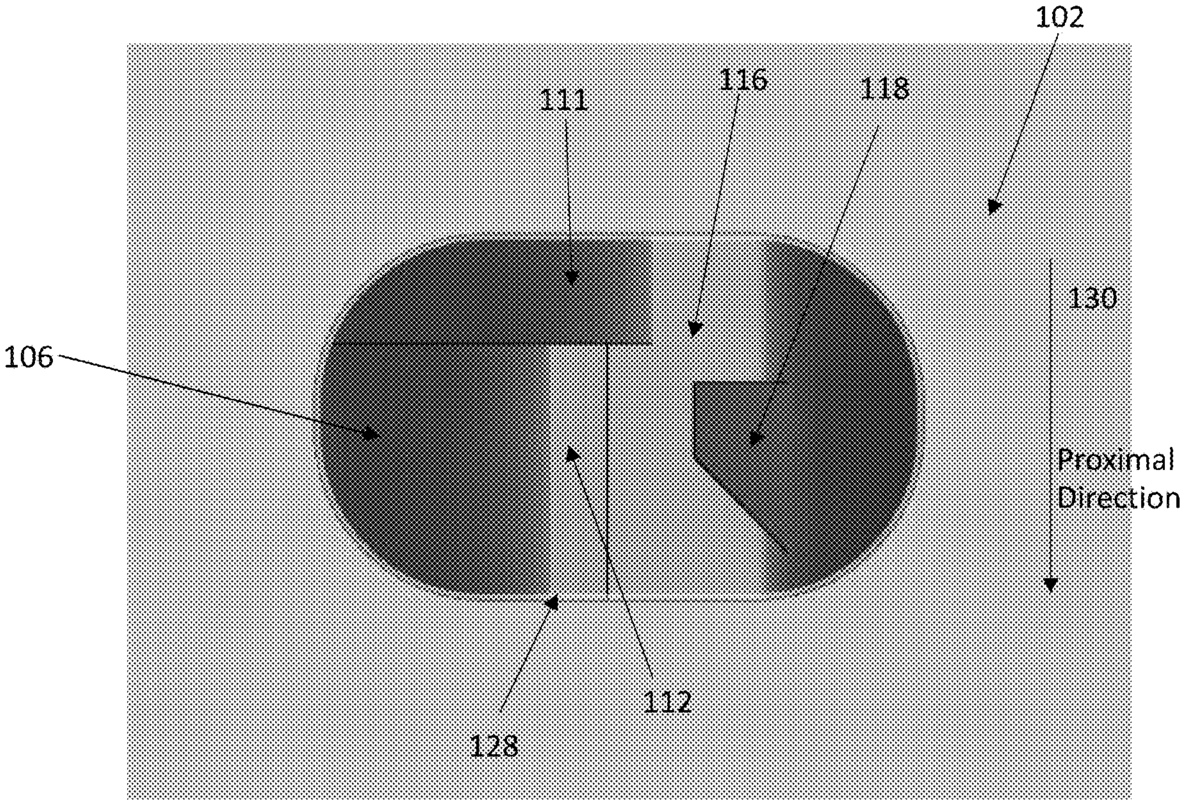
FIG. 14 depicts a partial top view of the outer plate of the mounting assembly from FIG. 1, wherein the lock is inserted within the outer plate and in an unlocked configuration, and spaced apart from the pin.
Figure 15:
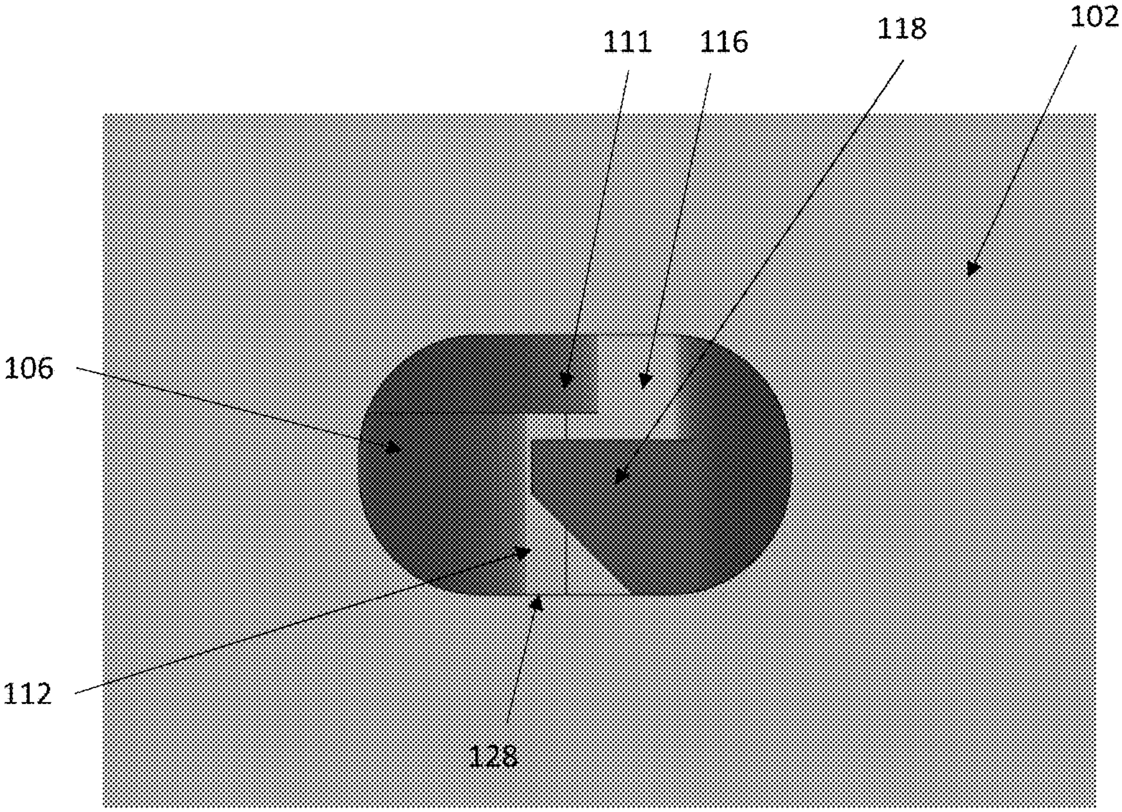
FIG. 15 depicts the partial top view of the outer plate from FIG. 14, wherein the lock is inserted within the outer plate and in a locked configuration, and configured to contact the pin.

Accordingly, FIG. 14 depicts the window 128, overlooking where the pin 106 is passed through the second outer plate aperture 116, such that the groove 112 of the pin aligns with the channel between apertures 115 (not shown) and 116. As depicted in FIG. 14, wherein the lock 108 is in the unlocked configuration, the tab 118 does not contact the pin 106 nor is it positioned within the groove 112, such that the pin can be pulled out of the second outer aperture 116. By contrast, in FIG. 15, the lock 108 being in a locked configuration, causes the tab 118 to extend to be at least partially within the groove 112, thereby causing the tab 118 to contact a groove wall and edge of the distal cap 111 when the pin is attempted to be pulled out of the second outer plate aperture 116 (e.g., when the pin is pulled in a proximal direction 130). Accordingly, the contact between the distal cap 111 and the tab 118 prevents the pin from being pulled from the second outer plate aperture 115, such that the inner and outer plate remained coupled together (and thereby keeping the motor secured to the marine vessel, as described herein).

In other embodiments, the lock can include any other means for securing a pin within the second outer plate aperture, as known in the art. For example, in some embodiments, a proximal portion 119 (see for example FIG. 6) of the lock 108 is configured to be rotated (via for example, an actuation mechanism as described herein). In some embodiments, the proximal portion 119 of the lock comprises a shape, such as a rectangular shape (as depicted) that is configured to pass through the opening of the third plate aperture 115 at the inner surface of the outer plate 102, thereby being configured to partially enter the cavity 105 of the outer plate 102. Accordingly, in some embodiments, the inner plate comprises a corresponding aperture or cavity to receive the proximal portion 119, wherein rotation of the proximal portion 119 (for example from a vertical orientation to a horizontal orientation) prevents the lock 108 from being pulled out of the third outer plate aperture 115. In some embodiments, a horizontally oriented proximal portion 119 further extends at least partially across an opening of the second outer plate aperture 116 (since it is adjacent to the third outer plate aperture 116), such that, an inserted pin 106 is prevented from being withdrawn from the second outer plate aperture 116 due to contact by the distal cap 111 and the horizontally oriented proximal portion 119.

In other embodiments, the mounting assembly comprises an integrated motor and outer plate component, wherein the motor and outer plate are provided as a single component. In some embodiments, such motor includes bottom frame having a recess therein (similar to cavity 105) so as to receive an inner plate mounted to a marine vessel. Accordingly, in such embodiments, said integrated motor and outer plate component include similar outer plate apertures as described herein to receive a pin 106 and/or a lock 108 for securing the motor to the marine vessel.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions, as well as all combinations and permutations of the various elements and components recited herein, can be made by those skilled in the art without departing from the spirit and scope of the invention. Accordingly, the appended claims shall not be limited by the particular features that have been shown and described but shall be construed also to cover any obvious modifications and equivalents thereof.

The invention claimed is:

1. A marine vessel motor mounting assembly, comprising:
- an inner plate configured to be secured to the marine vessel;
- an outer plate configured to be secured to the motor on a first side, the outer plate comprising a cavity therethrough sized to receive the inner plate;
- a pin configured to be inserted within the outer plate and the inner plate; and
- a lock configured to be inserted within the outer plate, the lock comprising a lock body and a tab, the lock configured to transition from an unlocked configuration to a locked configuration, wherein, in the locked configuration, the tab protrudes from the lock body so as to contact the pin, thereby preventing the pin from being removed from within the outer plate and the inner plate, such that the inner plate is secured to the outer plate.

2. The mounting assembly of claim 1, wherein the lock is configured to transition between the unlocked configuration and the locked configuration, using an actuation mechanism.

3. The mounting assembly of claim 2, wherein the actuation mechanism comprises a key that mates with the a distal end of the lock body.

4. The mounting assembly of claim 1, wherein the tab is located at least partially within the lock body when in the unlocked configuration, such that the tab extends from within the lock body when transitioning to the locked configuration.

5. The mounting assembly of claim 1, wherein the pin comprises a groove at distal portion thereof, the groove being defined by two groove walls and corresponding edges, wherein the tab in the locked configuration is configured to contact a groove wall and/or corresponding edge of the two groove walls and corresponding edges when the pin is inserted within the outer plate.

6. The mounting assembly of claim 1, wherein the inner plate comprises a first inner plate aperture, the outer plate comprises a first and second outer plate aperture, such that the pin is configured to be inserted within the first outer plate aperture, the first inner plate aperture, and the second plate aperture, so as to couple the inner plate and the outer plate together.

7. The mounting assembly of claim 6, wherein the outer plate further comprises a third outer plate aperture for receiving the lock.

8. The mounting assembly of claim 7, wherein the outer plate further comprises a channel between the second outer plate aperture and the third plate aperture.

9. The mounting assembly of claim 8, wherein the channel is configured to allow the tab to extend from the lock body located within the third outer plate aperture to the second outer plate aperture, so as to contact the pin.

10. The mounting assembly of claim 7, wherein the tab extends i) a first length from the lock body in the locked configuration, and a ii) a second length from the lock body in the unlocked configuration, wherein the first length is greater than the second length.

11. The mounting assembly of claim 10, wherein the tab in the unlocked configuration at least partially extends through the channel, such that the lock is secured to the outer plate within the third outer plate aperture.

12. The mounting assembly of claim 1, wherein the motor is a trolling motor.

13. The mounting assembly of claim 1, wherein the inner plate is secured to a bow of the marine vessel.

14. A method for securing a motor to a marine vessel, the method comprising;
- securing a first plate to the marine vessel;
- placing a second plate over the first plate, wherein the second plate comprises a cavity therein such that the first plate is disposed within the cavity, the second plate configured to be secured with the motor;
- inserting a pin within the first plate and the second plate;
- inserting a lock within the second plate, wherein the lock comprises a lock body and a tab; and
- transitioning the lock from an unlocked configuration to a locked configuration, such that the tab extends from the lock body in the locked configuration to contact the pin, thereby preventing removal of the pin from the second plate.

15. The method of claim 14, wherein transitioning the lock to the locked configuration comprises using a key that mates with the a distal end of the lock body.

16. The method of claim 14, wherein the tab is located at least partially within the lock body when in the unlocked configuration, such that the tab extends from within the lock body when transitioning to the locked configuration.

17. The method of claim 14, wherein the pin comprises a groove at distal portion thereof, the groove being defined by two groove walls and corresponding edges, wherein the tab in the locked configuration is configured to contact a groove wall and/or corresponding edge of the two groove walls and corresponding edges within the second outer plate.

18. The method of claim 14, wherein the first plate comprises a first aperture, the second plate comprises a second and third aperture, such that the pin is configured to be inserted within the second aperture, the first aperture, and the third aperture, so as to couple the first plate and the second plate together.

19. The method of claim 18, wherein the second plate further comprises a fourth aperture for receiving the lock.

20. The method of claim 19, wherein the second plate further comprises a channel between the fourth aperture and the third aperture.

* * * * *